United States Patent [19]

Anderson et al.

[11] 4,022,942
[45] May 10, 1977

[54] PROCESS OF PREPARING FIBROUS SHEET FROM HIGH-ORTHO PHENOLIC RESOLE RESIN VARNISH

[75] Inventors: George J. Anderson; Harry M. Culbertson, both of Wilbraham, Mass.

[73] Assignee: Monsanto Company, St. Louis, Mo.

[22] Filed: Feb. 17, 1972

[21] Appl. No.: 227,262

[52] U.S. Cl. .............................. 427/382; 260/29.3; 427/381; 428/290

[51] Int. Cl.² ........................ C09J 3/14; C09J 5/06

[58] Field of Search ............. 260/29.3, 53 R, 57 R; 161/257; 427/381, 382

[56] References Cited

UNITED STATES PATENTS

| | | | |
|---|---|---|---|
| 2,475,587 | 7/1949 | Bender et al. | 260/57 |
| 3,083,183 | 3/1963 | Boschert et al. | 260/57 |
| 3,332,911 | 7/1967 | Huck | 260/57 |
| 3,476,707 | 11/1969 | Culbertson et al. | 260/57 |
| 3,485,797 | 12/1969 | Robins | 260/57 |
| 3,526,677 | 9/1970 | Dahms et al. | 260/53 X |
| 3,620,902 | 11/1971 | Anderson et al. | 260/53 |
| 3,637,429 | 1/1972 | Anderson et al. | 260/53 X |
| 3,691,121 | 9/1972 | Anderson et al. | 260/53 X |

FOREIGN PATENTS OR APPLICATIONS 773,611  5/1957  United Kingdom

OTHER PUBLICATIONS

Whitehouse, Phenolic Resins pp. 7–9.
J. Appl. Chem., 7, 1957, pp. 676–699, Fraser et al.

*Primary Examiner*—Howard E. Schain
*Attorney, Agent, or Firm*—Joseph S. Nelson; William J. Farrington; James C. Logomasini

[57] ABSTRACT

The invention relates to high ortho phenolic resole resins and varnishes. The phenolic resole resins are produced by reacting under acidic conditions formaldehyde with a phenol in the presence of a divalent electropositive metal ion. The resulting novel resole is then dissolved in organic solvent. The solutions are useful as varnishes in the manufacture of impregnated sheets, laminates and other reinforced plastics.

13 Claims, No Drawings

PROCESS OF PREPARING FIBROUS SHEET FROM HIGH-ORTHO PHENOLIC RESOLE RESIN VARNISH

BACKGROUND OF THE INVENTION

This invention concerns high ortho resole resins and varnishes and their process for manufacture. These resins are used broadly in laminated thermostetting products consisting essentially of fibrous sheet material such a cellulose paper, asbestos paper, cotton fabric or mat, asbestos fabric or mat, wood veneer, nylon fabric, glass fabric, etc., which are impregnated or coated with a thermosetting resin binder and consolidated under high temperature and pressure into hard products of high mechanical strength.

The principal resins used are phenolics made by the chemical combination and partial polymerization of formaldehyde and phenolic compounds, such as phenols, cresols or cresylic acid under carefully controlled conditions. These resins are dissolved in alcohol or alcohol-water or other suitable solvents to form varnish solutions with which the fibrous sheet materials may be impregnated or coated.

After impregnation and drying, the material is cut into sheets which are stacked together between metal plates and pressed under high temperatures and pressures to form laminated thermosetting sheets. During this operation the resin passes from a fusible soluble stage into one which is practically insoluble and infusible or thermoset.

The properties of laminated thermosetting materials can be varied over a large range by use of different sheet fillers, binder resins or laminating processes. The industry, however, has grouped these products into a reasonable number of grades or classes for most application.

On the basis of strength-weight ratios, laminated phenolics are among the strongest materials known. The high strength, excellent resistance to heat and moisture and good electrical properties account for its use in large volumes in all branches of the electrical and electronic industry having great commercial and consumer utility.

This dynamic industry has placed higher and higher performance and fabricating requirement on the phenolic resins used in laminated sheet materials. The resin suppliers and those skilled in the art are aware of these new requirements.

The phenolic resins principally used in laminated thermosetting industry have been prepared by the chemical combination and partial polymerization of formaldehyde and phenolic compounds and are of two classes known as "novolacs" and "resoles".

The novolac resins are phenolic resins in which the phenolic molecules are joined by methylene bridges located at the ortho-and para-positions relative to the phenolic hydroxyl groups with the polymer chain having phenolic end groups. Novolacs are usually prepared with acid catalysts using an excess of phenol over aldehyde. High ortho-novolacs are also known as prepared by a process disclosed in U.S. Pat. No. 3,476,707. The preferred process for preparation is with a catalyst system comprising an oxide or hydroxide of an electropositive metal and a halogen acid using an excess of phenol over aldehyde.

The "high-ortho" novolac resins are characterized by having mostly ortho/ortho methylene bridges. The novolac resins are thermoplastic and soluble in alcohols to form varnishes. As used in laminates they must be cured to insoluble, infusible resins with the addition of a source of formaldehyde, such as hexamethylenetetramine or paraform. The "high-ortho" resins are considered to have enhanced heat curing speeds over the conventional novolac resin.

Phenolic resole resins are prepared generally using an alkaline catalyst system with an excess of formaldehyde giving resins having high percentages of pendent methylol groups rather than phenolic end groups which give condensates with methylene groups. U.S. Pat. No. 3,485,797 discloses phenolic resole compositions produced by using a soluble divalent metal salt catalyst with an excess of aldehyde under substantially anhydrous conditions and in the presence of an inert organic diluent to produce a mixture of dimethyol compounds. These condensates analyzed as a mixture of 0,0'-dimethylol-phenol, 2,2'-dihydroxy 3,3'-dimethyolbenzylic ether and 2,2'-dihydroxy-3,3'-dimethyloldiphenylmethane. The preferred phenols disclosed in U.S. Pat. No. 3,485,797 are those that unsubstituted in the paraposition as well as the ortho-position for subsequent crosslinking reactions necessary for high reactivity. The most preferred are the unsubstituted phenol and the metasubstituted phenols being substituted either by a hydrocarbon radical, a oxyhydrocarbon radical or a halogen radical meta to the hydroxyl group.

Resole resin varnishes heretofore known when cured have generally suffered from a lack of properties for certain applications, for example, electrical properties, water resistance properties, and mechanical strength properties. Because of these deficiencies, there has been a long felt need in the art of resole resin varnishes for modified phenol-aldehyde resole resins which would overcome one or more of these deficiencies.

The novel "high ortho" resole resins of this invention have a much higher benzyl ether content than the typical resoles known to the art. A typical range of ether-linkage content would be 25–90% as contrasted with alkaline catalyzed which ranges 0–10%. The resulting methylene linkage content is lower averaging 10–75% as contrasted to the usual resole of at least 90%. Such resin varnishes form laminates with excellent water resistance, a high degree of post formability along with high bond strength and flexibility. The benzyl ether linkage has been found to be superior to the methylene linkage of the typical alkaline catalyzed resole in providing postformability and flexibility through the internal plasticization of the ether linkage as contrasted to the more rigid methylene linkage of the typical resole resin.

Other improved properties of the novel "high ortho" resoles that are associated with the higher benzyl ether structure are the ability of these novel resoles to:
1. Impregnate paper and glass cloth more readily providing one-pass coatability because of lower viscosity.
2. Tolerate higher water contents in the paper and glass cloth during lamination. The more polar ether structure of the resole is more compatible and provides faster impregnation.
3. Provide greater compatibility with a wide range of polar and nonpolar plasticizers, flame retardants and other additives.
4. Provide greater stability in varnish storage than the usual methylene linked resoles.

This invention is directed particularly to varnishes of certain novel phenol-aldehyde resole resins in organic solvents. These varnishes are especially adapted for use in the manufacture of impregnated sheet materials and of laminates thereof. The products have high flexural strength, low water absorption and excellent electrical properties. These varnishes display lower viscosity and hence excellent penetration qualities as respects nonwoven, sheet-like materials as compared to conventional resoles.

SUMMARY OF THE INVENTION

It has been discovered that when phenols selected from the group of phenol, meta substituted phenol and a mixture of phenol and at least one substituted phenol are reacted with aldehydes using a high aldehyde-phenol ratio under acid conditions in the presence of an organic acid salt of a divalent metal ion that a novel high ortho phenol-aldehyde resole resin having high percentages ether linkages are formed.

The particular catalysts used were selected from a group consisting of an oxide, or hydroxide or organic acid salt of a divalent electropositive metal ion.

Divalent electropositive metals of oxides or hydroxides or organic acid salts employed in accordance with the invention are calcium (Ca++), barium (Ba++), strontium (Sr++), magnesium (Mg++), zinc (Zn++), manganous (Mn++) manganese, cadmium (Cd++), cobaltous (CO++) cobalt and plumbous (Pb++) lead. Preferred metals are magnesium (Mg++), zinc (Zn++) and manganous (Mn++) manganese and cobalt (CO++).

When an organic acid salt is employed, it is preferred that it be a salt of an aliphatic monocarboxylic acid such as formic acid or acetic acid, however, the salt can also be derived from an aliphatic hydroxycarboxylic acid such as lactic acid, or the salt can be derived from aromatic carboxylic acids such as benzoic acid or dicarboxylic acids such as adipic and succinic. Typical salts useful for the purpose of the invention are cadmium formate, zinc acetate, magnesium acetate, manganese acetate, lead acetate and zinc benzoate.

The organic acid is selected such that the salt formed with the divalent electropositive metal is soluble in catalytic amounts in the reacting mixture. The organic acids described above also form soluble organic salts in situ with the metal oxides and hydroxides. Regardless of theory, the divalent metal ions provided by the oxides, hydroxides or salts are provided in soluble form to direct the condensation of the formaldehyde with the phenol giving a high ortho orientation. The organic acid is used in sufficient quantities to insure the solubility of the metal ion and maintain the pH in the range of about pH4 to pH7. In general the amount of oxide or hydroxide or salt, calculated as a percentage based on the amount of phenol, is within the range of 0.1 to 10%, the preferred amount being within the range of 1.0 to 5.0%.

The high ortho-phenol formaldehyde resins of this invention differ from prior art conventional alkaline catalyzed resole resins in that they are reactive to the extent of about 70% to 90% in the ortho position and in addition the condensed phenol linkages are characterized by having about 25% to 90% dibenzyl ether structures. In contrast, alkaline catalyzed resoles have about 0% to 10% benzyl ether linkages and significantly less than 70% substitution in the ortho position.

The resins of this invention are further characterized by having a relatively low degree of condensation or polymerization i.e., less than 4 and are capable of giving a cure rate of less than 30 minutes, preferably less than 20 minutes.

Certain high ortho resole resins are known, however, they differ from the present invention in that the phenol-formaldehyde reactions taught are only those for the ortho position with no para reactions and have degrees of polymerization greater than 4. Such resins are deficient in that they are extremely slow curing and in fact need external curing reagents to effect thermosetting properties such as the use of acids, hexa or isocynates for curing such resins.

Further, since there are no reacting groups in the para position they can only provide high molecular weight resins with a degree of polymerization of greater than 4 giving slow or negligible cure rates for the resulting polymers.

This lack of thermosetting character is overcome by the present invention by controlling the formaldehyde to phenol reaction to give 10 to 30% para orientation essential for chain branching and true thermosetting characteristics. The further effect of having appreciable amounts of para orientation is that the thermosetting characteristics are obtained without the addition of external catalysts and with resins having a low degree of polymerization, i.e. having a DP of less than 4. This para activity also allows for the use of various substituted phenols, in particular ortho substituted phenols in admixture with phenol and within the scope of this invention.

One approach to producing modified phenol-aldehyde resins has involved using as starting materials for reaction with aldehydes, substituted phenols so as to produce phenolaldehyde resins having a high molecular weight in proportion to the total amount of phenol used in resin manufacture. The ratio of resole resin prepolymer molecular weight (before curing) to starting phenol content can be termed, for convenience purposes, the PMW efficiency.

In the past, increase in PMW efficiency have been attempted either by using naturally occurring substituted phenols, for example, cresol or cresylic acid, or by using synthetically substituted phenols include naturally occurring drying oil. Phenol-aldehyde resins made from phenols substituted with these starting materials, however, have a plurality of disadvantages. For one thing, the cost of starting materials is so significant that the cost of the resulting phenolaldehyde resin is increased to the point where it is not competitive with other polymeric materials as respects many use applications. In addition, the resulting phenol-aldehyde product when cured either has an undesirably wide distribution of physical and chemical properties, perhaps caused by using a substituted phenol mixture in which the substituents vary widely from one another structurally, or has an undesirably narrow distribution of physical and chemical properties, perhaps caused by using a substituted phenol in which the substituents vary only slightly or even not at all from one another structurally. Furthermore, even though the PMW efficiency is improved by using such prior art substituted phenols, the phenolic resins derived therefrom tend to be inferior as respects such properties as storage stability, viscosity, cure rate, or necessity for close manufacturing tolerances.

The present invention wherein phenol and or substituted phenols or mixtures thereof are reacted with formaldehyde to give high ortho phenol-aldehyde resole resins having high percentages of methyol and ether linkages overcomes the problem of using a wide variety of substituted phenols or their mixtures. A high PMW efficiency can be realized without sacrificing critical physical properties.

The substituted phenols useful in the resins of this invention are all phenols that have at least one reactive position open in the ortho or para position. Phenol and such substituted phenol or their mixtures can be used. Substituted phenols include all phenols having at least one attached radical selected from the group consisting of alkyl, aryl, cycloalkyl, alkenyl, cycloalkenyl, alkaryl, aralkyl, carboxylic, halogen and mixtures thereof.

Examples of substituted phenols include: phenols substituted with straight and branched chain alkyl radicals having 1 to 16 carbon atoms, e.g. cresol, isopropylphenol, 2,3-xylenol, 3,5-xylenol, 3,4,xylenol, 2,6 xylenol, mono and disubstituted butyl, amyl, octyl, nonyl, decyl and dodecyl phenols; aryl substituted phenols, e.g., phenyl phenol and naphthyl phenol; cycloalkyl phenols e.g., terphenylphenols, e.g., using limonene, pinene, menthadiene, cyclohexyl and cyclopentyl; cycloalkenyl phenols, e.g., cyclopentenyl, dicyclopentadieneyl and methacyclopentadieneyl phenols; alkenyl phenols, e.g., allylphenol, butenylphenol, pentenyl phenol, hexenylphenol; alkaryl phenols, e.g., tolylphenol, xylyphenol, propylphenylphenol; aralkyl phenols, e.g., benzyl, phenethyl, alphamethyl, phenyethyl, indyl and cumyl phenols bisphenol A, bisphenol F, halophenols, e.g., chlorophenols, bromophenols, 2,4 dichlorophenol, 2,6, dichlorophenol, etc.

It has now been discovered that when one reacts an aldehyde with a phenol according to this invention, which has been synthetically substituted with a certain well-defined mixture of $C_8$ through $C_{13}$ carbocyclic compounds, there is produced a high ortho phenol-aldehyde resole resin product which has a high PMW efficiency. When such resole resin product is used as the resin component in a varnish, the resulting novel varnish has the capacity, when used in the manufacture of laminates, to produce when thermoset, an excellent combination of electrical, mechanical and water resistance properties. These varnishes can contain resin solids which are advanceable to a greater extend without forming precipitates from the varnish organic solvent phase than is the case with aqueous solutions of these new phenol-aldehyde resole resin products.

The substituted phenol mixture used to make such resin is itself prepared by reacting phenol under FriedelCrafts conditions with a controlled mixture of carbocyclic compounds. The mixture of carbocyclic compounds comprises (on a 100 weight percent basis when in a form substantially free of other materials):

A. from about 10 through 40 weight percent of compounds each molecule of which has:
1. the indene nucleus,
2. from 9 through 13 carbon atoms,
3. as nuclear substituents from 0 through 4 methyl groups, B. from about 5 through 70 weight percent of compounds each molecule of which has:
1. the dicyclopentadiene nucleus,
2. from about 10 through 13 carbon atoms,
3. as nuclear substituents from 0 through 3 methyl groups, C. from about 15 through 65 weight percent of compounds each molecule of which has:
1. a phenyl group substituted by a vinylidene group,
2. from about 8 through 13 carbon atoms,
3. as substituents from 0 through 3 groups selected from the class consisting of methyl and ethyl, D. from about 0 through 5 weight percent divinyl benzene, E. provided that the sum total of all such compounds in any given such mixture of carbocyclic compounds is always 100 weight percent.

At the time when such controlled mixture of carbocyclic compounds is reacted with phenol as indicated, there can be present in such mixture as diluents inert (i.e., as respects reactivity towards phenol under Friedel-Crafts reaction conditions) organic compounds such as aromatic and aliphatic hydrocarbons. Thus, there is present, conveniently, at least about 25 weight percent of diluent in such total combination of mixture of carbocyclic compounds and diluent, although this value is variable depending upon reactants and reaction conditions. While there is no apparent upper limit on the amount of diluent present, it is preferred that the amount of diluent present be not greater than about 95 weight percent (same basis). Preferably, the amount of diluent ranges from about 15 to 70 weight percent (same basis). Up to about 15 weight percent (same basis) of water can be present.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD". Another suitable such mixture is available from Monsanto Company, St. Louis, Missouri, under the trade designation "Resin Oil". Still another such mixture is available from the Gulf Oil Company under the trade designation "Resin Former Feed Stock". A presently preferred such mixture is the Monsanto Company "Resin Oil" which is a $C_8$ to $C_{13}$ product cut with a boiling range of from about 300 to 425° F. (150° to about 220° C.) and contains the indicated carbocyclic compound mixture. Shown below in Table I is a breakdown such as is made by vapor phase chromatography showing composition of these three carbocyclic compound mixtures:

TABLE I

| Carbocyclic Compounds | Gulf Oil | Monsanto[3] | Enjay[4] |
|---|---|---|---|
| Vinylidene Aromatics | | | |
| Styrene $C_8$ | 7.6 | 1.4 | 10.1 |
| Alpha-methylstyrene $C_9$ | 1.6 | 2.8 | 2.2 |
| Beta-methylstyrene $C_9$ | 1.5 | 1.6 | 2.1 |
| Vinyltoluene $C_9$ | 4.5 | 17.4 | 10.5 |
| $C_2$ Alkylstyrene[1] $C_{10}$ | 0.9 | 6.2 | 5.8 |
| Divinyl benzene $C_{10}$ | 0.3 | 1.3 | 1.6 |
| Indenes | | | |
| Indene $C_9$ | 12.7 | 17.6 | 12.7 |
| Nethylindene $C_{10}$ | 0.3 | 5.5 | 7.6 |
| Cyclopentadienes | | | |
| Isoprene-cyclopentadiene $C_{10}$ | 0.6 | 0.3 | — |
| Dicyclopentadiene $C_{10}$ | 42.7 | 13.9 | 1.1 |
| Methylcyclopentadiene $C_{11}$ | 12.4 | 4.6 | 2.1 |
| Diluents | | | |
| Alkyl Aromatics | | | |
| Benzene $C_6$ | 0.5 | — | 0.1 |
| Toluene $C_7$ | 3.9 | — | 0.8 |
| $C_2$ Alkylbenzene $C_8$ | 7.4 | 0.4 | 12.1 |
| $C_3$ Alkylbenzene $C_9$ | 1.2 | 19.2 | 22.2 |
| $C_4$ Alkylbenzene $C_{10}$ | — | 4.1 | 6.3 |
| Naphthalenes | | | |
| Naphthalene $C_{14}$ | 0.2 | 3.2 | 2.2 |
| Unidentified | 2.1 | — | — |

TABLE I-continued

| Carbocyclic Compounds | Gulf Oil | Monsanto[3] | Enjay[4] |
|---|---|---|---|
| (Aliphatics) Total Carbocyclic Compound mixture content | 84.8 | 72.6 | 55.9 |
| ASTM Boil Range, ° F. (ASTM D-86) | | | |
| Initial boiling point | 283 | 315 | 307 |
| 10% | 318 | 333 | 320 |
| 50% | 329 | 343 | 342 |
| 90% | 348 | 367 | 401 |
| End point | 364 | 402 | 411 |
| Residue | 1.0 | — | — |
| Specific Gravity | 0.952 | 0.933 | 0.909 |

FOOTNOTES FOR TABLE I
[1]This styrene compound is selected from the group consisting of ethylstyrene and dimethylstyrene.
[2]Available commercially from the Gulf Oil Company as "Resin Former Feed Stock."
[3]Available commercially from the Monsanto Company under the trade designation "Resin Oil."
[4]Available commercially from Enjay Company under the trade designation "Heart Cut LPD."

By the term "dicyclopentadiene" reference is had to a molecular having the structure:

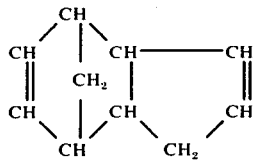

By the phrase "when in a form substantially free of other materials" reference is had to a mixture (e.g. of starting materials, of products, or the like, as the case may be) which is substantially free (e.g. on an analytical or a theoretical basis) of substances (like inerts) other than such mixture itself. For example, in Table I above, the carbocyclic compound mixtures are composed of indenes, vinylidene aromatics, and dicyclopentadienes as well as inert diluents, such as "alkyl aromatics", "naphthalenes" and "unidentified aliphatics", but each contains a combination (on a 100 weight percent basis in a form substantially free of other materials) of components (indenes, dicyclopentadiene, and vinylidene aromatics) as described above.

To react phenol with such an aforedescribed carbocyclic compound mixture, it is convenient to use Friedel-Crafts conditions.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. In the practice of this invention, the phenol and suitable Friedel-Crafts acid catalyst are mixed, brought to the proper temperature, and the carbocyclic compound mixture metered into the acidified (or catalyzed phenol).

For purposes of this invention, the reaction of carbocyclic compound mixture with phenol is preferably carried out at temperatures in the range of from about 25° to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70° and 140° C. The progress of the reaction can be monitored, if desired, by measuring the quantity remaining of unreacted carbocyclic compound mixture using, for example, vapor phase chromotography.

Friedel-Crafts catalysts which may be used in place of aluminum chloride, or together with aluminum chloride, include:

A. other inorganic halides, such as gallium, titanium, antimony and zinc halides (including $ZnCl_2$);

B. inorganic acids such as sulphuric, phosphoric and the hydrogen halides (including HF);

C. activated clays, silica gel and alumina;

D. $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid and the like, or with inorganic acids, such as phosphoric acid, sulfuric acid, and the like, and E. alkyl, aryl and aralkyl sulfonic acids, such as ethanesulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, $\beta$-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol, and catalyst can be used, it is particularly convenient to react phenol with carbocyclic compound mixture in the presence of less than about 10 weight percent (based on the starting phenol) of acid catalyst. Typically, from about 0.1 to 1 weight percent of Friedel-Crafts acid catalyst is employed (based on phenol).

The reaction mass is heated to a temperature in the range of from about 25° to 200° C. The rate of this reaction is dependent, to some degree, on the temperature employed. In general, the reaction is rapid, and a complete reaction between phenol and carbocyclic compound mixture is preferred. Generally, a total heating time of from about 10 minutes to 4 hours is employed. The various process variables are summarized in Table II below.

TABLE II

| Process Variable | Broad Range | Preferred Range |
|---|---|---|
| Temperature (° C.) | about 25 to 200° C. | about 40 to 130° C. |
| Reaction time | about 4 hours | about 10 to 30 min. |
| Catalyst (Based on phenol) | less than about 10 weight percent | about 0.1 to 1.0 weight percent |
| Total carbocyclic mixture[1] (based on 100 parts by weight phenol | about 10 to 80 parts by weight | about 15 to 55 parts by weight |

[1]On a 100 weight percent basis when in a form substantially free of other materials.

The properties of a given so-substituted phenol product are affected by the process conditions used to make that product (e.g. molecular weight distribution, color, and the like). The resulting reaction product is, as those skilled in the art will appreciate, a complex mixture of various differend substituted phenols produced from the reaction of phenol under Friedel-Crafts conditions with the carbocyclic compound starting mixture to produce phenol molecules which are substituted on ring carbon atoms in the ortho and para-positions only and on phenol hydroxyl oxygen atoms by moieties derived from such carbocyclic compound.

A substituted carbocyclic compound phenol product can be prepared in a form substantially free of starting materials by conventional distillation separation techniques (e.g. steam distillation, vacuum stripping, and the like), as those skilled in the art will appreciate, but in making resoles for use in this invention, such product can be used directly as made. In general, the substituted phenols used in this invention are prepared by the same general procedure described above for the particular carbocyclic mixture using Friedel-Crafts conditions as shown in the examples.

In general, to produce a high ortho resole for use in this invention, a phenol or mixture of phenols are reacted under acid aqueous liquid phase conditions with from about 0.8 to 2.8 mols of formaldehyde per mol of substituted phenol (preferably from 0.9 to 1.75 mols formaldehyde per mol of phenol) in the presence of a catalyst selected from the group consisting of an oxide or hydroxide or organic acid salt of a divalent electropositive metal. Said group is at least partially soluble in the reacting mixture having an organic acid present in such amount that the reacting mixture is maintained between pH4 and pH7.

This reaction mixture is then heated to temperatures of from about 60° to 100-° C. for a time sufficient to substantially react most of the formaldehyde and thereby produce a desired high ortho resole product. Times of from about 2 to 4 hours are typical. Aqueous liquid phase preparation conditions are used.

It will be appreciated that the formaldehyde to phenol mol ratios herein described have reference to the total amount of phenol present before a reaction, including the phenol which is substituted by the carbocyclic compound mixture, as described above.

The high ortho resole product produced by reacting the substituted phenol with formaldehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole resin product having molecular weight characterisics and high methylene ether content as above indicated.

The methylol and methylene ether content and the degree of advancement are readily controllable, so that one can optimize such a resole resin for use in a particular application. For purposes of this invention, a high ortho phenol-formaldehyde resole resin or resole can be regarded as being the reaction product of the above-described substituted phenol mixture and formaldehyde under the aqueous acid catalyzed conditions as described herein which product can be thermoset by heat alone without the use of a curing catalyst.

In general, such a resole product as made is normally a multiphase aqueous emulsion whose viscosity depends, in any given instance, upon process and reactant variables, but which usually ranges from a syrupy liquid to a semi-solid state. Such a resole product usually separates from such aqueous phase as a light colored material whose viscosity varies from a syrup to a solid.

To make a resole resin varnish of this invention such an emulsion is dehydrated, preferably under heat and reduced pressure, to a water content of from about 0.5 to 15 weight percent (based on total resole weight). When the resulting water content in under about 5 weight percent, there is produced a single-phased, clearlight-colored, high solids, viscous resole resin syrup. In any given instance, its total solids content, (residual) water content, and viscosity depend upon the amount of substituted phenol aldehyde product present, the mol ratio of formaldehyde to substituted phenol, specific type and amount of methylolation catalyst, conditions and reactants used to substitute the phenol, methylolation temperature, degree of advancement, and the like.

Since this one-stage viscous resin is heat reactive by itself, it is convenient and preferred to cool it during and towards the end of dehydration so as to slow reaction with itself and thereby prevent gelation. This material is characteristically a syrup or a one-stage lump resin.

After such dehydration, the resulting resole resin can be dissolved in a relatively volatile, inert organic solvent medium having properties as defined above. It is not necessary, and it is preferred not, to prepare the high ortho resole resin in the form of a one-stage resin before dissolution thereof in such organic solvent.

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl Ketone.) The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonone, actane, petroleum fractions, etc. Preferably, the total water content of a varnish of the invention is below about 10 weight percent, and more preferably falls in the range of from about 1–6 weight percent.

Those skilled in the art will appreciate that care should preferably be taken to use an organic liquid system in which high ortho phenolic resole resins are completely soluble as well as any water present. Adding, for example, a ketone or an ether-ester solvent like butyl cellosolve will generally improve the water tolerance (ability to dissolve water) of a solvent system. The resole of this invention have a higher water tolerance than the usual alkaline catalyzed resoles. The high methylene ether content provides greater compatibility with water in both the varnish and the laminated article.

These varnishes are characteristically light colored, one-phase, clear liquid solutions, each having a viscosity ranging from about 5 to 500 centipoises. The exact viscosity of a given varnish depends upon many chemical process and product variables. For impregnating applications, viscosities of from about 25 to 500 centipoises are preferred.

The total solids content of a given varnish product can be as high as about 85 weight percent or even higher, and as low as about 20 weight percent or even lower, but preferred solids contents usually fall in the range of from about 25 to 65 weight percent. As those skilled in the art will appreciate, the varnishes of this invention are of lower viscosity and can be advanced (e.g. crosslinked as by heating to produce larger molecules) to a greater extent without forming precipitates from the organic solvent phase than is the case of corresponding alkaline resole products.

When used for impregnation and reinforcing purposes, the liquid resole resin varnishes of this invention are useful for impregnating cellulosic paper, asbestos paper, and other nonwoven sheet structures as well as woven fabrics (cotton, glass fibers, nylon, etc.), etc. Impregnation can be accomplished by any convenient means, including dipping, coating, spraying, mixing, or the like. The so-impregnated material is dried to lower the volatiles content and then heated to advance the resin to the proper degree for the intended use. The resole varnishes of this invention are useful in the preparation of laminates, such as those made from such impregnated sheet materials. Such laminates are used in electrical applications as supports or as insulation for conductive elements. The laminates are generally manufactured in a sheet or block from which is then punched or otherwise machined to provide desired configurations for a particular end use.

The resole varnishes of this invention are also useful in the manufacture of cloth laminates, and automotive oil filters. A suitable oil filter media, for example, is prepared by impregnating with a varnish of this invention, cellulosic fiber paper modified with a synthetic fiber (polyester, or the like) and having a thickness of from about 5 to 20 mils. Sufficient resole varnish resin of this invention is used to obtain an impregnated sheet member having a cured resin content of about 15 to 25 percent, based on the weight of the paper. After such paper is so impregnated, it is heated to advance the resin to a so-called B-stage, and then is corrugated or pleated to form the filter element. The filter element is then assembled with the end use filter container and heated to 250° F. to 350° F. for from 5 to 20 minutes to cure the resin. When cured, the product has good flexibility and low tendency to crack during use.

In general, a varnish of the present invention can be used to make reinforced plastics.

The varnishes of this invention comprise:
A. from about 30 to 75 weight percent of a dissolved mixture of a high ortho phenol-formaldehyde resole resin,
B. from about 0.5 to 15 weight percent of dissolved water,
C. the balance up to 100 weight percent of any given varnish being an organic liquid which:
  1. is substantially inert (as respects such resin and water).
  2. evaporates below about 150° C. at atmospheric pressures,
  3. is a mutual solvent for said resole resin and said water (if present), the amount of said organic liquid being present in any given varnish being such as to maintain both said resole resin and said water in dissolved form.

The high ortho phenol-formaldehyde resole resin employed in the products of this invention has a formaldehyde to phenol mol ratio of from about 0.8 to 2.8 (preferably from about 0.9 to 1.75), and is produced by reacting, in the presence of an organic acid salt of a divalent metal under liquid aqueous phase conditions, a certain substituted phenol mixture with formaldehyde. The resole resin used in this invention further has a relatively low molecular weight, substantial water tolerance and has a methanol solubility such that a 60 weight percent solution thereof can be prepared in methanol. Such methanol solution characteristically has a viscosity not greater than about 500 centipoises, and preferably this viscosity lies in the range from about 40 to 500 centipoises. In addition, this resin has a free formaldehyde content which is less than about 5 weight percent (based on total dry resin weight.)

In a more preferred embodiment of the present invention, an organic solution or varnish contains from about 55 to 65 weight percent (total solution basis) of the dissolved phenolic resin. In such a more preferred solution, there are from about 2 to 10 parts of dissolved water (total solution basis). In this invention, all solids are conveniently measured using the ASTM Test Procedure D-115-55.

Also in such a preferred embodiment, the substituted phenol used in making phenolic resin is made using a carbocyclic compound mixture in which there are from about 20 through 40 weight percent of compounds, having the indene nucleus (as above described), from about 15 through 30 weight percent of compounds having the dicyclopentadiene nucleus (as above described) and from about 30 through 65 weight percent of compounds having a phenyl group and a vinylidene group (as described below), there being a total of 100 weight percent of these three components in a given such carbocyclic compound mixture when such is in a form substantially free of other materials.

The term "vinylidene" as used herein has generic reference both to vinylidene radicals ($CH_2=C=$), and vinyl radicals ($CH_2=CH-$ or $-CH=CH-$); observe that in carbocyclic compound mixtures used in this invention having a phenyl group substituted by a vinylidene group, alpha-methyl substitution is included in this definition, as well as styrene, methyl styrene, and ethyl styrene.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Part One — Preparation of Resins

Examples 1 to 15 are set forth to illustrate the novel resins of the present invention along with methods for their preparation. These resins are then used to prepare laminates as shown in Part Two below.

EXAMPLE 1

Basic Resin Synthesis

Charge 100 parts of phenol and 0.5 parts of concentrated sulfuric acid to a suitable reaction vessel and heat the mixture to 120° C. Add 50 parts of a carbocyclic compound mixture available commercially under the trade designation "Resin Oil" from Monsanto Company, having a composition as given above to the starting mixture holding the temperature of the mixture at 120° C. The temperature is maintained at 120° C an additional 15 minutes after the addition is complete. The mixture is then cooled to 50° C and 2.5 parts of zinc oxide and 2 parts acetic acid added. After thoroughly mixing 80 parts of 50% formaldehyde solution are added and the mixture then heated to atmospheric reflux. Reflux is continued for 4 hours then the resin is cooled. Volatile material is then removed under a vacuum of 26 inches of mercury to an end temperature of 70° C. Then add 55 parts of methanol and 4 parts ammonium hydroxide to form a solution having 59% solids (measured by heating 1½ grams of solution for 3 hours at 135° C), an Ostwald viscosity of 100 centipoise at 25° C., a pH of 6.5 and a water content of 5%.

EXAMPLE 2

Using the general procedure of Example 1 a resin was prepared using 100 parts of phenol and ½ part sulfuric acid charged with 30 parts of a carbocyclic compound mixture of Resin Oil with composition as in Example 1. Charged at 120° C. and held an additional 15 minutes at 120° C. and then cooled to 50° C. where 2.5 parts of zinc oxide and 2.0 parts of acetic acid are added. After thoroughly mxing 90 parts of 50% formaldehyde solution are added and the mixture then heated to reflux. Reflux is continued for 4 hours then the resin is cooled. Volatile material is then removed under a vacuum of 26 inches of mercury to an end temperature of 70° C. 55 parts of methanol and 4 parts ammonium hydroxide are added to form a solution having 50% solids and a viscosity of 55 centipoise at 25° C.

EXAMPLE 3

Using the general procedure of Example 1, a resin was prepared using 100 parts of phenol and ½ part of sulfuric acid charged with 70 parts of resin oil at 120° C. Held an additional 15 minutes at 120° C. the mixture is then cooled to 50° C., and 2.5 parts of zinc oxide and 2.0 parts acetic acid added. After thoroughly mixing 67 parts of 50% formaldehyde solution are added and the mixture is then heated to reflux. Reflux is continued for 4 hours, then the resin is cooled. Volatile material is then removed under a vacuum of 26 inches mercury to an end temperature of 70° C. Seventy parts of methanol and 4 parts of ammonium hydroxide are added to form a solution having 55% solids and a viscosity of 30 centipoise at 25° C.

EXAMPLE 4

A resin was prepared as in Example 1 but employing 1.5 parts of zinc oxide and 1 part acetic acid as catalyst.

EXAMPLE 5

A resin was prepared as in Example 1 but employing 5 parts of zinc oxide and 4.5 parts acetic acid as catalyst.

EXAMPLE 6

A resin was prepared as in Example 1 but employing 3 parts zinc acetate dihydrate in place of zinc oxide and acetic acid as catalyst.

EXAMPLE 7

A resin was prepared as in Example 1 but employing 6 parts of zinc acetate dihydrate in place of zinc oxide and acetic acid as catalyst.

EXAMPLE 8

A resin was prepared as in Example 1 but employing 3 parts cobalt acetate in place of zinc oxide and acetic acid as catalyst.

EXAMPLE 9

A resin was prepared as in Example 1 but employing 1 part of magnesium oxide in place of zinc oxide and acetic acid as catalyst.

EXAMPLE 10

A resin was prepared as in Example 1 but employing 1.5 parts formic acid in place of acetic acid as catalyst.

EXAMPLE 11

A resin was prepared as in Example 1 but employing 2.0 parts of lactic acid in place of acetic acid as catalyst.

EXAMPLE 12

Charge 100 parts of phenol and 0.5 parts of concentrated sulfuric acid to a suitable reaction vessel and heat the mixture to 120° C. Add 50 parts of a carbocyclic compound mixture available commercially under the trade designation "Resin Oil" from Monsanto Company, having a composition as given above, to the starting mixture, holding the temperature of the mixture at 120° C. The temperature is maintained at 120° C. and additional 15 minutes after the addition is complete. The mixture is then cooled to 50° C and 2.5 parts of zinc oxide added. After thoroughly mixing 80 parts of 50% formaldehyde solution are added and the mixture heated to atmospheric reflux. Reflux is continued for 3 hours, then 2.0 parts of acetic acid is added and reflux continued for an additional 2 hours. The resin is then cooled and volatile material removed under a vacuum of 26 inches of mercury to an end temperature of 70° C. Then 55 parts of methanol and 4 parts of ammonium hydroxide are added to form a solution having 58% solids and an Ostwald viscosity of 30 cps.

EXAMPLE 13

A resin was prepared as in Example 1 but employing 70.5 parts of 50% formaldehyde.

EXAMPLE 14

A resin was prepared as in Example 1 but employing 96 parts of 50% formaldehyde.

The following Examples 15 to 17 are control examples set forth to illustrate resins prepared by the processes of the prior art.

EXAMPLE 15 (CONTROL)

Charge 100 parts of phenol and 1 part of concentrated sulfuric acid to a suitable reaction vessel and heat the mixture to 50° C. Add 50 parts of carbocyclic compound mixture used in Example 1 to the mixture over a period of 30 minutes while keeping the temperature stable at 50° C. After addition of the carbocyclic compound mixture, add 7.5 cc. of 28% NH₄OH to neutralize the acid catalyst. To the neutralized reaction mixture add 2 parts of triethylamine and 60 parts of 50% formalin (50–50 formaldehyde-water). Now heat the reaction mixture to a reflux at 100° C. and continue refluxing for 2 hours. Then cool the reaction mixture and remove volatile material under a vacuum of 28 inches of mercury until a temperature of 80° C. is reached. Then add 50 parts of methanol to the reaction mixture.

EXAMPLE 16 (CONTROL)

Charge 100 parts of phenol and 1 part of concentrated sulfuric acid to a suitable reaction vessel and heat the mixture to 50° C. Add 70 parts of carbocyclic compound mixture used in Example 1 to the mixture over a period of 30 minutes while keeping the temperature stable at 50° C. After addition of the carbocyclic compound mixture, add 7.5 cc. of 28% NH$_4$OH thereto to neutralize the acid catalyst. To the neutralized reaction mixture add 2 parts of triethylamine and 60 parts of 50% formalin (50—50 formaldehyde-water). Now heat the reaction mixture to a reflux at 100° C. and continue refluxing for 2 hours. Then cool the reaction mixture and remove volatile material under a vacuum of 27 inches of mercury until a temperature of 80° C. is reached. Then add 50 parts of methanol to the reaction mixture.

EXAMPLE 17 (CONTROL)

A resin was prepared using the procedures of Example 16 but employing 30 parts of carbocyclic compound instead of 70 parts and using a catalyst combination of 2 parts of triethylamine and 3 parts of hexamethylenetetramine instead of 2 parts of triethylamine and 80 parts of 50% formalin instead of 60 parts.

Part Two — Preparation of Laminates

Examples 18 and 19 illustrate the preparation of laminates using the resins prepared in the above examples.

EXAMPLE 18

Test laminates were prepared from the resin solutions of Examples 15 and 16 which are amine catalyzed resoles and compared with test laminates prepared from resin solutions of Examples 1 and 3 which are the high-ortho resoles prepared by divalent electropositive metal catalyst. The amine catalyzed resins fail to penetrate as readily and required preimpregnated paper to reach adequate resin contents or a two pass impregnation whereas the high-ortho resoles penetrates readily and need only one pass impregnation.

Test laminates were prepared from the resin solutions of Examples 15 and 16 and 10 mil electrical grade cotton linters paper which has been preimpregnated to a 15 percent resin content with a low molecular weight liquid phenol-formaldehyde resin. The resin is made as follows: Phenol (100 parts), 50 percent formalin (111 parts) and triethylamine (5 parts) is charged to a vessel. After reacting at 70° C. until the mixture's free formaldehyde content is less than 4 percent, the mixture is cooled. About 55 percent solids is obtained.

Eight plies of the so-preimpregnated paper are then impregnated to a total resin content of about 60 percent with the resin solution of Examples 15 and 16. The impregnated papers are dried for 19 minutes at 135° C. The 8 plies of dried impregnated paper are assembled into a deck and cured for 30 minutes at 150° to 160° C. under a pressure of 1000 psi to form a laminate about 1/16 inch thick.

Test laminates were prepared from resins 1 and 3 using 10 mil electrical grade cotton linter papers without preimpregnation. Eight plies were impregnated to a total resin content of about 60% and dried and cured as above.

Various properties of the laminates along with, for comparison purposes, the National Electrical Manufacturers Association (NEMA) specifications thereof for XXXP type laminates are given below in TableI.

TABLE I

| Laminate | % Water Absorption | Dielectric Constant[1] A | D24/23 | Dissipation Factor[1] A | D24/23 |
|---|---|---|---|---|---|
| Ex. 1 Resin | 0.30 | 4.20 | 4.30 | .031 | .034 |
| Ex. 3 Resin | 0.43 | 4.33 | 4.50 | .033 | .034 |

TABLE I-continued

| Laminate | % Water Absorption | Dielectric Constant[1] A | D24/23 | Dissipation Factor[1] A | D24/23 |
|---|---|---|---|---|---|
| Ex. 15 Resin[2] | 0.42 | 4.5 | 4.6 | .033 | .034 |
| Ex. 16 Resin[2] | 0.59 | 4.35 | 4.4 | .032 | .033 |
| NEMA XXXP (Standard) | 1.00 | 4.6 | 4.8 | .035 | .035 |

[1]ASTM TEST D-150-54T
[2]Two pass impregnation

The above data show less water absorption and excellent electrical properties for Resins 1 and 3 considering that they are one pass resins as compared to Resins 15 and 16 which are two pass resins. Furthermore, the electrical properties of the resins of this invention are well below the maximum NEMA Specifications for XXXP type laminates shown above providing the industry with a product of great utility.

EXAMPLE 19

Laminates were made with one pass impregnation according to the procedure of Example 18 using the resin solutions of Examples 7, 8, 9, 10, 11 and 12 to determine if high-ortho resoles made with the other divalent electropositive catalysts would give NEMA grade laminates. The test values are shown in Table II.

TABLE II

| Laminate | % Water Absorption | Dielectric Constant A | D24/23 | Dissipation Factor A | D24/23 |
|---|---|---|---|---|---|
| Ex. 7 | 0.45 | 4.52 | 4.78 | .034 | .035 |
| Ex. 8 | 0.33 | 4.50 | 4.61 | .032 | .033 |
| Ex. 9 | 0.36 | 4.41 | 4.56 | .035 | .035 |
| Ex. 10 | 0.31 | 4.46 | 4.58 | .032 | .032 |
| Ex. 11 | 0.33 | 4.53 | 4.72 | .032 | .033 |
| Ex. 12 | 0.54 | 4.60 | 4.80 | .035 | .035 |
| NEMA XXXP Standard | 1.00 | 4.6 | 4.8 | .035 | .035 |

It is evident that divalent electropositive metal ions of the same class as zinc produce high ortho resoles that give NEMA grade laminates. The resins of this invention being one pass impregnations again clearly show improved properties over the conventional amine catalyzed resoles of Examples 15 and 16 requiring two impregnations to reach the same level of electrical properties.

ANALYSIS OF CHEMICAL STRUCTURE OF HIGH-ORTHO RESOLES

The above resins were analyzed by Chromatographic Analysis using the published procedures of Higginbottom, H. P., Culberton, H. M., Woodbrey, J. C., J. Anal. Chem., 37:1021–1026 (1965), entitled the "Quantitative Gas-Liquid Chromatography of Mononuclear Hydroxy-Methyl Phenols As Acetate Esters".

The resins were also analyzed by Nuclear Magnetic Resonance procedures using the published procedures of Woodbrey, J. C., Higginbottom, H. P., Culbertson, H. M., J. Pol. Sci., Part A, 3:1079–1106 (1965), entitled, "Proton Magnetic Resonance Study on the Structure of Phenol-Formaldehyde Resins."

Definition of Chromatographic Terms

According to the procedure, all of the free hydroxyl groups are reacted with acetic acid to form acetates. The chromatographic analysis determines then the percent of the various types of hydroxyl groups as percent acetate and tabulates them as shown below.

PA — percent phenol as phenol-acetate.
2-HMA — percent ortho-hydroxy methyl phenol as acetate.
4-HMA — percent para-HMA.
2, 6, HMA — percent ortho, ortho-HMA.
2, 4 HMA — percent ortho, para-HMA.
2, 4, 6 HMA — percent ortho, para, ortho-HMA.

Definition of Nuclear Magnetic Resonance Terms

This procedure has the capability of reading out the average numbers of groups attached to each phenolic nucleus contained in a phenolic resin. The various groups attached and analyzed are tabulated below:

$R_A$ — aromatic protons per phenolic nucleus.
$R_{AM}$ — methyol (—$CH_2OH$) groups per phenolic nucleus.
$R_{EB}$ — ether bridges (—$CH_2O$—$CH_2$—) per phenolic nucleus.
$R_{MB}$ — methylene bridges (—$CH_2$—) per phenolic nucleus.
N — number average degree of polymerization.
Mn — number average molecular weight.

Chromatographic values and NMR values for the several resins are tabulated in Table III.

It is evident from the NMR data of Table III that the catalyst system used in the present invention gives a resole resin that has a much higher ether-bridge content than the conventional amine or basic catalyzed resole resins. Compare resin 2 of the present invention with resin 17, a conventional resole which has the same resin oil content. Resin 2 has some 6 times the ether content of resin 17 and roughly ½ the methylene content. The higher ether content contributed to the ease of penetration of this resin in impregnating laminating papers allowing heavy loadings of 60% resin with one pass impregnation as contrasted to conventional basic catalyzed resoles which usually require 2 impregnations to reach this level.

The other resole resins of this invention (1 and 3 to 14) show the same range of high ether-linkage content when using the divalent electropositive metal catalysts of the class claimed.

The Chromatographic Analysis data* show that the resoles of the present invention are indeed largely ortho substituted resoles. The analysis revealed no evidence of para-substitution alone or with single ortho substitution and only minor amounts with ortho-ortho substitution. These data show the highly specific nature of the catalyst system to not only provide high ether-linked resoles but resoles with specific ortho linkages. The basic catalyzed resole of Example 17 as analyzed shows a high para-substitution as well as ortho giving a less stable resin than the high-ortho resin of the present invention.

*(of the monomers)

It is evident from Table III that the substituted phenol monomeric mixture containing unsubstituted phenols of Example 1 analyzes by gas chromatography to have 4.78 weight percent of 2 HMA; 4.22 weight percent of 2,6 HMA or 8.44 weight percent total ortho; 1.75 weight percent of 2,4,6 HMA or 3.50 total ortho giving a grand total of 16.72 weight percent ortho and 1.75 percent 2,4,6 HMA as para giving a grand total of ortho-para substitution of 18.47; with 90 molar percent being ortho and 10 percent being para. The most preferred being 70 to 100 percent ortho.

The linkages of the resole resin are of two types, e.i. methylene and the benzyl ether being designated in Table III as $R_{MB}$ and $R_{EB}$ respectively. Example 1 of Table III shows $R_{EB}$ to be 0.31 and $R_{MB}$ to be 0.20; the ratio of R to total linkages is in this example equal to 0.60 or 60 percent benzyl ether linkages. The preferred range is 25 percent to 100 percent of benzyl ether linkages.

EXAMPLE 20

Charge 100 parts of phenol, 2 parts zinc oxide, 2 parts acetic acid and 96 parts 50% formaldehyde solution to a suitable reaction vessel and heat the mixture to reflux at 100° C. Reflux is continued for 5 hours then the resin is cooled. Volatile material is then removed under a vacuum of 22 inches of mercury to an end temperature of 65° C., then add 64 parts of isopropyl alcohol to form a solution of 60% solids, an Ostwald viscosity of 503 cps. a pH of 5.20 water content 4.96 and G.E. gel 12.6 minutes. Analysis* shows the resin to have 52% 0-0, 30.5% 0-p, and 17–5% p-p methylene bridges. See Table IV for complete analysis of the resin.

* (of only the methylene bridges)

TABLE III

| EXAMPLE | 1 | 2 | 3 | 4 | 5 | 6 | 7 | 8 | 9 | 10 | 11 | 12 | 13 | 14 | 17 |
|---|---|---|---|---|---|---|---|---|---|---|---|---|---|---|---|
| PA | 5.45 | 4.67 | 5.15 | 5.30 | 4.09 | 5.1 | 4.45 | 7.65 | 6.75 | 4.6 | 5.0 | 6.5 | 6.57 | 2.65 | 3.0 |
| 2 HMA | 4.78 | 5.65 | 3.80 | 4.00 | 3.2 | 4.66 | 4.35 | 4.97 | 3.3 | 5.15 | 5.6 | 6.5 | 5.35 | 2.72 | 2.3 |
| 4 HMA | ← | | | | below level of analysis | | | | | | | | | → | 1.8 |
| 2, 6 HMA | 4.22 | 5.65 | 4.55 | 4.1 | 2.75 | 4.8 | 4.26 | 4.90 | 4.2 | 5.7 | 5.75 | 7.8 | 4.32 | 4.1 | 3.6 |
| 2, 4 HMA | ← | | below level of analysis | | | → | | 1.7 | | ← | below level of analysis | | | → | 2.5 |
| 2, 4, 6 HMA | 1.75 | | 1.15 | 1.1 | 0.95 | 1.07 | 1.05 | 0.84 | | 1.1 | 1.0 | 1.75 | 1.42 | 0.95 | 1.0 |
| $R_A$ | 3.38 | 3.42 | 3.73 | 3.53 | 3.560 | 3.71 | 3.54 | 3.41 | 3.62 | 3.53 | 3.65 | 3.64 | 3.61 | 3.37 | 3.35 |
| $R_{AM}$ | 0.61 | 0.60 | 0.50 | 0.55 | 0.425 | 0.56 | 0.51 | 0.88 | 0.49 | 0.59 | 0.59 | 0.64 | 0.50 | 0.55 | 0.55 |
| $R_{EB}$ | 0.31 | 0.30 | 0.25 | 0.30 | 0.30 | 0.28 | 0.27 | 0.22 | 0.23 | 0.26 | 0.26 | 0.22 | 0.26 | 0.36 | 0.05 |
| $R_{MB}$ | 0.20 | 0.18 | 0.14 | 0.17 | 0.208 | 0.09 | 0.21 | 0.13 | 0.22 | 0.18 | 0.13 | 0.14 | 0.18 | 0.18 | 0.44 |
| N | 2.04 | 1.94 | 1.63 | 1.88 | 2.05 | 1.58 | 1.94 | 1.54 | 1.79 | 1.79 | 1.65 | 1.57 | 1.79 | 2.18 | 2.05 |
| Mn* | 3.28 | 2.76 | 2.72 | 2.97 | 3.18 | 2.48 | 3.03 | 2.53 | 2.75 | 2.80 | 2.59 | 2.30 | 2.78 | 3.50 | 3.01 |

*Mn × $10^{-2}$

EXAMPLE 21

Repeat Example 20 but using 112 parts of 50% formaldehyde solution. Reflux is continued for 9 hours then cooled. Volatile material is then removed under a vacuum of 26 inches of mercury to an end temperature of 65° C., then add 42 parts of isopropyl alcohol to form a solution of 69% solids with a viscosity of 1500 cps. The chromatographic analysis of the resin shows 3.44% phenol, 2.84%-2 HMA, 0.60%-4 HMA, 2.54%-2,6 HMA and 1.0%-2,4,6 HMA.

Ten mil cotton linter paper was impregnated with the above resin and dried in an oven at 275° F to a 5% flow and 45% resin content. Nine plies of the treated and dried paper were pressed at 1000 psi and 300° F for 30 minutes to give a 1/16 inch laminate with the following properties: water absorption 1.28%, flexural strength 27,000 pounds, Dielectric constant 5.42, Dissipation factor 0.059 and gave excellent cold punch.

EXAMPLE 22

Charge 100 parts of phenol and 0.5 parts of concentrated sulfuric acid to a suitable reaction vessel and heat the mixture to 125° C. Add 30 parts of styrene monomer as alkylating reagent to the starting mixture holding the temperature of the starting mixture between 125° and 135° C. The temperature is maintained in this range an additional 15 minutes after the addition is complete. The mixture is then cooled to 50° C and 2.5 parts of zinc oxide and 2 parts of acetic acid added. After thoroughly mixing 80 parts of 50% formaldehyde solution are added and the mixture then heated to atmospheric reflux. Reflux is continued for four hours, then the resin is cooled. Volatile material is then removed under a vacuum of 26 inches of mercury to an end temperature of 70° C. Then add 65 parts of methanol and four parts of ammonium hydroxide to form a solution having 60% solids, an Ostwald viscosity of 50 cps. G.E. gel of 17.3 and a water content of 4.0%.

EXAMPLES 23 – 26

Prepare resins as in Example 22 employing the following alkylating agents: Example 23 – 30 parts of limonene; Example 24 – 30 parts diisobutylene (2,4,4 trimethyl-1-pentene); Example 25 – 30 parts of octene-1; and Examples 26 – 30 parts of dicyclopentadiene of 95% purity.

Analysis of the resins of Examples 20–26 are shown in Table IV below. The electrical properties of laminates using the resins of Examples 22–26 are shown in Table V.

EXAMPLE 27

A resin is prepared as in Example 1 following the same procedure until the point of volatile removal. At that point, the resin is dehydrated and volatile material removed to an end temperature of 95° C. under a vacuum of 28 inches mercury. The resin syrup is then dropped into a cooling tray and allowed to harden, thus forming a solid one-stage lump.

It is evident to those skilled in the art that many variations may be made in the products and processes of this invention without departing from the spirit and scope thereof.

TABLE IV

| Examples | Resin Properties | | Gel | $R_A$ | Resin Acetate - NMR | | | N |
| --- | --- | --- | --- | --- | --- | --- | --- | --- |
| | Solids | Viscosity | | | $R_{1M}$ | $R_{EH}$ | $R_{MH}$ | |
| 20 | 60.0 | 503 | 12.6 | 3.29 | .498 | .246 | .268 | 2.06 |
| 21 | 69.0 | 1500 | 13.0 | 3.31 | .338 | .450 | .223 | 3.05 |
| 22 | 60.3 | 50 | 17.3 | 3.62 | 0.367 | 0.367 | 0.178 | 2.20 |
| 23 | 60.7 | 100 | 12.9 | 3.63 | 0.38 | 0.295 | 0.202 | 1.98 |
| 24 | 59.4 | 49 | 21.9 | 3.58 | 0.422 | 0.307 | 0.193 | 2.00 |
| 25 | 55 | 49 | 11.9 | 3.63 | 0.460 | 0.295 | 0.161 | 1.83 |
| 26 | 61.3 | 104 | 14.9 | | | | | |

TABLE V

| Examples | Water Absorption | LAMINATE ELECTRICALS | | | | | |
| --- | --- | --- | --- | --- | --- | --- | --- |
| | | DC | | | DF | | |
| | | A | D24/23 | D48/50 | A | D24/23 | D48/50 |
| 22 | 0.48 | 4.38 | 4.58 | 5.14 | .032 | .035 | .046 |
| 23 | 0.60 | 4.70 | 4.86 | 5.51 | .037 | .043 | .058 |
| 24 | 0.59 | 4.22 | 4.32 | 5.05 | .035 | .038 | .055 |
| 25 | 0.86 | 4.77 | 4.95 | 5.88 | .041 | .047 | .071 |
| 26 | 0.44 | 4.38 | 4.46 | 4.96 | .032 | .035 | .038 |

What is claimed is:

1. A process for preparing a resin impregnated sheet which comprises:
   A. preparing a resole resin by reacting a phenol selected from the group consisting of phenol, meta-substituted phenol and a mixture of phenol and at least one substituted phenol with formaldehyde in an aqueous reaction mixture containing at least 14 weight percent water under reflux at about 60° C. to 100° C. in the presence of a divalent electropositive metal ion and sufficient organic acid to maintain a pH in the range between about 4 and 7, and thereafter dehydrating the resulting aqueous emulsion to a water content of from about 0.5 to 15 weight percent,
   B. dissolving the resole resin in a volatile inert organic solvent to yield a solution of between 20 and 85 weight percent solids and a viscosity in the range of 5 to 500 centipoises,
   C. impregnating a fibrous sheet substrate with the resole resin solution to provide a fibrous sheet substrate containing from about 15 to 70 weight percent of the resole resin,
   D. drying the impregnated fibrous sheet substrate to reduce the volatile content, and
   E. advancing the resin to the B-stage.

2. The process of claim 1 wherein the substituted phenol is a phenol having a least one attached radical selected from the group consisting of alkyl, aryl, cycloalkyl, alkenyl, cycloalkenyl, alkaryl, carbocyclic, halogen and mixtures thereof.

3. The process of claim 1 wherein the substituted phenol is the addition product of phenol and a compound selected from the group consisting of indenes, vinylidene aromatics, cyclopentadienes, dicyclopentadienes, nonenes, octenes, terpenes and mixtures thereof.

4. The process of claim 1 wherein the substituted phenol is the addition product of phenol and a compound selected from the group consisting of styrene, limonene, 2,4,4-trimethyl-1-pentene, octene-1 and dicyclopentadiene.

5. The process of claim 1 wherein the substituted phenol mixture is prepared by gradually adding a mixture of carbocyclic compounds to a preheated liquid phase mixture of phenol and a FriedelCrafts acid catalyst, maintained in the range from about 25° to 200° C., whereby over a time interval of from about 10 minutes to four hours from about 10 to 80 parts by weight of the mixture of carbocyclic compounds reacts with each 100 parts by weight of the phenol, the mixture of carbocyclic compounds comprising (on a 100 weight percent basis when in a form substantially free of other materials):
   1. from about 10 to 40 weight percent of compounds each molecule of which has:
       a. the indene nucleus,
       b. from 9 to 13 carbon atoms,
       c. as nuclear substituents from 0 to 4 methyl groups,
   2. from about 5 to 70 weight percent of compounds each molecule of which has:
       a. the dicyclopentadiene nucleus,
       b. from 10 to 13 carbon atoms,
       c. as nuclear substituents from 0 to 3 methyl groups,
   3. from about 15 to 65 weight percent of compounds each molecule of which has:
       a. a phenyl group substituted by a vinylidene group,
       b. from 8 to 13 carbon atoms,
       c. as substituents from 0 to 3 groups selected from the class consisting of methyl and ethyl,
   4. from about 0 to 5 weight percent divinyl benzene,
   5. provided that the sum total of all such compounds in the mixture of carbocyclic compounds is 100 weight percent.

6. The process of claim 1 wherein the substituted phenol mixture is prepared by gradually adding a mixture of carbocyclic compounds to a preheated liquid phase mixture of phenol and a Friedel-Crafts acid catalyst, maintained in the range from about 25° to 200° C., whereby over a time interval of from about 10 minutes to four hours from about 10 to 80 parts by weight of the mixture of carbocyclic compounds reacts with each 100 parts by weight of the phenol, the mixture of carbocyclic compounds comprising (on a 100 weight percent basis when in a form substantially free of other materials):
   1. from about 10 to 40 weight percent of compounds each molecule of which has:
       a. the indene nucleus,
       b. from 9 to 13 carbon atoms,
       c. as nuclear substituents from 0 to 4 methyl groups,
   2. from about 15 to 30 weight percent of compounds each molecule of which has:
       a. the dicyclopentadiene nucleus,
       b. from 10 to 13 carbon atoms,
       c. as nuclear substituents from 0 to 3 methyl groups,
   3. from about 30 to 65 weight percent of compounds each molecule of which has:
       a. a phenyl group substituted by vinylidene group,
       b. from 8 to 13 carbon atoms,
       c. as substituents from 0 to 3 groups selected from the class consisting of methyl and ethyl,
   4. from about 0 to 5 weight percent divinyl benzene,
   5. provided that the sum total of all such compounds in the mixture of carbocyclic compounds is 100 weight percent.

7. The process of claim 1 wherein the divalent electropositive metal ion is provided by a compound selected from the group consisting of oxides, hydroxides, and organic acid salts of the metal, and wherein the amount of the compound is within the range of about 0.1 to 10.0 weight percent of the weight of the phenol.

8. The process of claim 1 wherein the divalent electropositive metal ion is selected from the group consisting of zinc ($Zn^{++}$), cobalt ($Co^{++}$), magnesium ($Mg^{++}$), manganese ($Mn^{++}$) and calcium ($Ca^{++}$).

9. The process of claim 1 wherein the organic acid added to control the pH is selected from the group consisting of formic, acetic, lactic, benzoic, adipic, and succinic acids.

10. The process of claim 1 wherein the fibrous substrate comprises fibers selected from the group consisting of cellulose, asbestos, cotton, glass, nylon and polyester.

11. The process of claim 1 wherein the thickness of the fibrous substrate is in the range of 5 to 20 mils.

12. The process of claim 1 wherein the formaldehyde to phenol mol ratio is in the range of 0.9 to 1.75.

13. The process of claim 1 wherein the B-stage resin is further advanced to the cured state.

* * * * *